US006948184B1

(12) United States Patent
Del Sol et al.

(10) Patent No.: US 6,948,184 B1
(45) Date of Patent: Sep. 20, 2005

(54) SYSTEM AND METHOD FOR CALIBRATING POWER LEVEL DURING INITIAL RANGING OF A NETWORK CLIENT DEVICE

(75) Inventors: Timothy Del Sol, Arlington Heights, IL (US); Gopalan Krishnamurthy, Wheeling, IL (US)

(73) Assignee: 3Com Corporation, Marlborough, MA (US)

( * ) Notice: Subject to any disclaimer, the term of this patent is extended or adjusted under 35 U.S.C. 154(b) by 802 days.

(21) Appl. No.: 09/726,818

(22) Filed: Nov. 30, 2000

(51) Int. Cl.[7] .......................................... H04N 7/173
(52) U.S. Cl. ...................... 725/111; 725/114; 725/118; 725/130; 370/242; 370/252; 375/220; 375/377
(58) Field of Search .............................. 375/222, 220, 375/377; 370/242, 252; 725/111, 105, 114, 725/117, 119, 120, 121, 129, 130; 455/69

(56) References Cited

U.S. PATENT DOCUMENTS

| | | | |
|---|---|---|---|
| 4,644,533 A | 2/1987 | Braff et al. ................... 370/94 |
| 4,881,263 A | 11/1989 | Herbison et al. ............. 380/21 |
| 4,996,685 A | 2/1991 | Farese et al. ............... 370/58.1 |
| 5,014,234 A | 5/1991 | Edwards, Jr. ............... 364/900 |
| 5,138,712 A | 8/1992 | Corbin ........................ 395/700 |
| 5,301,273 A | 4/1994 | Konishi ....................... 395/200 |
| 5,347,304 A | 9/1994 | Moura et al. ................. 348/12 |
| 5,430,727 A | 7/1995 | Callon ..................... 370/85.13 |
| 5,442,749 A | 8/1995 | Northcutt et al. ...... 395/200.09 |
| 5,488,412 A | 1/1996 | Majeti et al. ................. 348/10 |
| 5,489,897 A | 2/1996 | Inoue ..................... 340/870.39 |
| 5,528,595 A | 6/1996 | Walsh et al. ............. 370/85.13 |
| 5,583,931 A | 12/1996 | Schneider et al. .......... 379/399 |
| 5,586,121 A | 12/1996 | Moura et al. ............... 370/404 |
| 5,598,410 A | 1/1997 | Stone ......................... 370/469 |
| 5,600,717 A | 2/1997 | Schneider et al. .......... 379/399 |
| 5,606,606 A | 2/1997 | Schneider et al. .......... 379/399 |
| 5,608,446 A | 3/1997 | Carr et al. ..................... 348/6 |
| 5,610,910 A | 3/1997 | Focsaneanu et al. ........ 370/351 |
| 5,623,542 A | 4/1997 | Schneider et al. .......... 379/399 |
| 5,623,601 A | 4/1997 | Vu ......................... 395/187.01 |
| 5,636,211 A | 6/1997 | Newlin et al. .............. 370/465 |
| 5,675,732 A | 10/1997 | Majeti et al. .......... 395/200.01 |
| 5,675,742 A | 10/1997 | Jain et al. .................... 395/200 |
| 5,678,041 A | 10/1997 | Baker et al. ................. 395/609 |
| 5,708,654 A | 1/1998 | Arndt et al. ................. 370/242 |
| 5,710,885 A | 1/1998 | Bondi .................... 395/200.54 |

(Continued)

FOREIGN PATENT DOCUMENTS

WO          WO 00/67385          11/2000

OTHER PUBLICATIONS

"Cable Modem to Customer Premise Equipment Interface Specification (Interim) SP-CMCI-I02-980317", Multimedia Cable Network Systems (MCNS) Holdings, L.P., Cable Television Laboratories, Inc., 1998, pp. ii to 40.

(Continued)

*Primary Examiner*—Ngoc K. Vu
(74) *Attorney, Agent, or Firm*—McDonnell Boehnen Hulbert & Berghoff LLP

(57) ABSTRACT

A system and method for calibrating power level during initial ranging of a network client device, such as cable modem facilitates communications between a network client device and a network device such as a cable modem termination system. The method includes dividing the dynamic range of the cable modem transmitter into a plurality of regions and attempting initial ranging in each of the different regions. If a response is not received from the network device, the method including adjusting the power level and reattempting the initial ranging in the different regions. Once a range response message is received from the network device the process of initial ranging is complete.

5 Claims, 9 Drawing Sheets

U.S. PATENT DOCUMENTS

| | | | |
|---|---|---|---|
| 5,724,510 A | 3/1998 | Arndt et al. | 395/200.5 |
| 5,761,602 A | 6/1998 | Wagner et al. | 455/3.1 |
| 5,778,181 A | 7/1998 | Hidary et al. | 395/200.48 |
| 5,784,597 A | 7/1998 | Chiu et al. | 395/552 |
| 5,790,198 A | 8/1998 | Roop et al. | 348/460 |
| 5,790,548 A | 8/1998 | Sistanizadeh et al. | 370/401 |
| 5,790,677 A | 8/1998 | Fox et al. | 380/24 |
| 5,790,770 A | 8/1998 | McClure et al. | 395/200.61 |
| 5,790,806 A | 8/1998 | Koperda | 395/200.82 |
| 5,793,747 A | 8/1998 | Kline | 370/230 |
| 5,799,086 A | 8/1998 | Sudia | 380/23 |
| 5,805,804 A | 9/1998 | Laursen et al. | 395/200.02 |
| 5,809,252 A | 9/1998 | Beighe et al. | 395/200.57 |
| 5,812,819 A | 9/1998 | Rodwin et al. | 395/500 |
| 5,815,664 A | 9/1998 | Asano | 395/200.57 |
| 5,818,845 A | 10/1998 | Moura et al. | 370/449 |
| 5,819,028 A | 10/1998 | Manghirmalani et al. | 395/185.1 |
| 5,819,042 A | 10/1998 | Hansen | 395/200.52 |
| 5,828,655 A | 10/1998 | Moura et al. | 370/236 |
| 5,828,666 A | 10/1998 | Focsaneanu et al. | 370/389 |
| 5,835,720 A | 11/1998 | Nelson et al. | 395/200.54 |
| 5,835,727 A | 11/1998 | Wong et al. | 395/200.68 |
| 5,841,777 A | 11/1998 | Cohen | 370/433 |
| 5,848,233 A | 12/1998 | Radia et al. | 395/187.01 |
| 5,852,721 A | 12/1998 | Dillon et al. | 395/200.47 |
| 5,854,901 A | 12/1998 | Cole et al. | 709/245 |
| 5,859,852 A | 1/1999 | Moura et al. | 370/449 |
| 5,864,679 A | 1/1999 | Kanai et al. | 709/238 |
| 5,870,134 A | 2/1999 | Laubach et al. | 348/12 |
| 5,872,523 A | 2/1999 | Dellaverson et al. | 340/825.52 |
| 5,884,024 A | 3/1999 | Lim et al. | 395/187.01 |
| 5,892,754 A | 4/1999 | Kompella et al. | 370/236 |
| 5,894,479 A | 4/1999 | Mohammed | 370/401 |
| 5,903,558 A | 5/1999 | Jones et al. | 370/351 |
| 5,909,549 A | 6/1999 | Compliment et al. | 709/223 |
| 5,913,037 A | 6/1999 | Spofford et al. | 395/200.56 |
| 5,915,119 A | 6/1999 | Cone | 395/750.02 |
| 5,922,049 A | 7/1999 | Radia et al. | 709/220 |
| 5,922,051 A | 7/1999 | Sidey | 709/223 |
| 5,923,659 A | 7/1999 | Curry et al. | 370/401 |
| 5,926,458 A | 7/1999 | Yin | 370/230 |
| 5,929,850 A | 7/1999 | Broadwin et al. | 345/327 |
| 5,941,988 A | 8/1999 | Bhagwat et al. | 713/201 |
| 5,943,604 A | 8/1999 | Chen et al. | 455/5.1 |
| 5,954,797 A | 9/1999 | Sidey | 709/223 |
| 5,958,007 A | 9/1999 | Lee et al. | 709/219 |
| 5,960,177 A | 9/1999 | Tanno | 395/200.59 |
| 5,974,453 A | 10/1999 | Andersen et al. | 709/220 |
| 5,982,748 A | 11/1999 | Yin et al. | 370/232 |
| 5,987,524 A | 11/1999 | Yoshida et al. | 709/245 |
| 5,991,292 A | 11/1999 | Focsaneanu et al. | 370/352 |
| 5,991,306 A | 11/1999 | Burns et al. | 370/429 |
| 5,996,076 A | 11/1999 | Rowney et al. | 713/201 |
| 5,999,536 A | 12/1999 | Kawafuji et al. | 370/401 |
| 6,003,077 A | 12/1999 | Bawden et al. | 709/223 |
| 6,005,851 A | 12/1999 | Craddock et al. | 370/329 |
| 6,006,264 A | 12/1999 | Colby et al. | 709/226 |
| 6,009,103 A | 12/1999 | Woundy | 370/401 |
| 6,012,088 A | 1/2000 | Li et al. | 709/219 |
| 6,013,107 A | 1/2000 | Blackshear et al. | 703/229 |
| 6,014,545 A | 1/2000 | Wu et al. | 455/3.1 |
| 6,018,767 A | 1/2000 | Fijolek et al. | 709/218 |
| 6,031,841 A | 2/2000 | Woundy | 370/410 |
| 6,032,019 A | 2/2000 | Chen et al. | 455/5.1 |
| 6,041,041 A | 3/2000 | Ramanathan et al. | 370/241 |
| 6,046,979 A | 4/2000 | Bauman | 370/229 |
| 6,049,546 A | 4/2000 | Ramakrishnan | 370/412 |
| 6,049,825 A | 4/2000 | Yamamoto | 709/221 |
| 6,049,826 A | 4/2000 | Beser | 709/222 |
| 6,052,724 A | 4/2000 | Willie et al. | 709/223 |
| 6,058,421 A | 5/2000 | Fijolek et al. | 709/225 |
| 6,061,349 A | 5/2000 | Coile et al. | 370/389 |
| 6,064,372 A | 5/2000 | Kahkoska | 345/173 |
| 6,065,049 A | 5/2000 | Beser et al. | 709/218 |
| 6,070,187 A | 5/2000 | Subramaniam et al. | 709/220 |
| 6,070,242 A | 5/2000 | Wong et al. | 713/201 |
| 6,070,246 A | 5/2000 | Beser | 713/201 |
| 6,073,178 A | 6/2000 | Wong et al. | 709/229 |
| 6,075,787 A | 6/2000 | Bobeck et al. | 370/395 |
| 6,091,709 A | 7/2000 | Harrison et al. | 370/235 |
| 6,094,431 A | 7/2000 | Yamato et al. | 370/395 |
| 6,104,700 A | 8/2000 | Haddock et al. | 370/235 |
| 6,112,258 A | 8/2000 | Miller et al. | 710/19 |
| 6,122,254 A | 9/2000 | Aydemir et al. | 370/235 |
| 6,128,298 A | 10/2000 | Wootton et al. | 370/392 |
| 6,130,879 A | 10/2000 | Liu | 370/230 |
| 6,130,880 A | 10/2000 | Naudus et al. | 370/235 |
| 6,137,792 A | 10/2000 | Jonas et al. | 370/354 |
| 6,137,793 A | 10/2000 | Gorman et al. | 370/360 |
| 6,148,410 A | 11/2000 | Baskey et al. | 714/4 |
| 6,157,965 A | 12/2000 | Mohammed et al. | 710/8 |
| 6,170,061 B1 | 1/2001 | Beser | 713/201 |
| 6,178,455 B1 | 1/2001 | Schutte et al. | 709/228 |
| 6,185,624 B1 | 2/2001 | Fijolek et al. | 709/239 |
| 6,189,102 B1 | 2/2001 | Beser | 713/201 |
| 6,208,656 B1 | 3/2001 | Hrastar et al. | 370/401 |
| 6,212,563 B1 | 4/2001 | Beser | 709/227 |
| 6,216,171 B1 | 4/2001 | Isono et al. | 709/250 |
| 6,223,222 B1 | 4/2001 | Fijolek et al. | 709/227 |
| 6,230,326 B1 * | 5/2001 | Unger et al. | 725/111 |
| 6,240,464 B1 | 5/2001 | Fijolek et al. | 709/250 |
| 6,243,369 B1 | 6/2001 | Grimwood et al. | 370/335 |
| 6,260,072 B1 | 7/2001 | Rodriguez-Moral | 709/241 |
| 6,269,099 B1 | 7/2001 | Borella et al. | 370/389 |
| 6,272,150 B1 | 8/2001 | Hrastar et al. | 370/486 |
| 6,275,853 B1 | 8/2001 | Beser et al. | 709/223 |
| 6,289,377 B1 | 9/2001 | Lalwaney et al. | 709/222 |
| 6,295,554 B1 | 9/2001 | Karadogan et al. | 709/219 |
| 6,301,223 B1 | 10/2001 | Hrastar et al. | 370/227 |
| 6,301,618 B1 | 10/2001 | Sitaraman et al. | 709/227 |
| 6,308,328 B1 | 10/2001 | Bowcutt et al. | 725/111 |
| 6,331,987 B1 | 12/2001 | Beser | 370/486 |
| 6,332,163 B1 | 12/2001 | Bowman-Amuah | 709/231 |
| 6,337,858 B1 | 1/2002 | Petty et al. | 370/356 |
| 6,351,773 B1 | 2/2002 | Fijolek et al. | 709/228 |
| 6,370,147 B1 | 4/2002 | Beser | 370/401 |
| 6,393,478 B1 | 5/2002 | Bahlmann | 709/224 |
| 6,442,158 B1 | 8/2002 | Beser | 370/352 |
| 6,449,291 B1 | 9/2002 | Burns et al. | 370/516 |
| 6,453,472 B1 | 9/2002 | Leano et al. | 725/111 |
| 6,490,727 B1 | 12/2002 | Nazarathy et al. | 725/129 |
| 6,510,162 B1 | 1/2003 | Fijolek et al. | 370/432 |
| 6,594,305 B1 * | 7/2003 | Roeck et al. | 375/222 |
| 2002/0101883 A1 * | 8/2002 | Ruszczyk et al. | 370/503 |
| 2002/0122050 A1 | 9/2002 | Sandberg | 345/705 |
| 2002/0136165 A1 | 9/2002 | Ady et al. | 370/241 |
| 2003/0028891 A1 | 2/2003 | Hardt et al. | 725/107 |

OTHER PUBLICATIONS

"Operations Support System Interface Specifications Baseline Privacy Interface MIB (Interim Specification) SP-OSSI-BPI-I01-980331", MCNS Holdings, L.P., 1997 and 1998, pp. ii to 33.

"Cable Modem Termination System-Network Side Interface Specification (Interim Specification) SP-CMTS-NSII01-960702", MCNS Holdings, L.P., 1996, pp. ii to 13.

"Removable Security Module Interface Specification (Interim Specification) SP-RSMI-I01-980204", MCNS Holdings, L.P., Cable Television Laboratories, Inc., 1997, pp. ii to 47.

"Baseline Privacy Interface Specification (Interim) SP-BPI-I01-970922", MCNS Holdings, L.P., 1997, pp. ii to 65.

"Operations Support System Interface Specification (Interim) SP-OSSII01-970403", MCNS Holdings, L.P., 1997, pp. 1 to 30.

"Radio Frequency Interface Specifications (Interim Specification) SP-RFI-I02-971008", MCNS Holdings, L.P., 1997, pp. ii to 186.

"Cable modem Telephony Return Interface Specification (Interim) SP-CMTRI-I01-970804", MCNS Holdings, L.P., Cable Television Laboratories, Inc., 1997, pp. ii to 73.

"Security System Specification (Interim Specification) SP-SSI-I01-970506", MCNS Holdings, L.P., 1997, pp. ii to 103.

"Internet Engineering Task Force", Request for Comments 2131, Dynamic Host Configuration Protocol (DHCP), Mar. 1997, pp. 1 to 42.

S. Adiraju, J. Fijolek, IPCDN Telephony Return MIP, Internet Engineering Task Force, Internet Draft, "<draft-ieft-ipcdn-tri-mib-00.1.txt>," Mar. 1998, pp. 1 to 26.

Kyees, P.J. et al., *ADSL: A New Twisted-Pair Access to the Information Highway*, IEEE Communications Magazine, vol. 33, Issue 4, Apr. 1995, pp. 52-60.

Huang, Yin-Hwa et al., *Design of an MPEG-Based Set-Top Box for Video on Demand Services*, Acoustics, Speech, and Signal Processing, 1995, ICASSP-95., 1995 International Conference, vol. 4, ISBN: 0-7803-2431-5, May 9-12, 1995, pp. 2655-2658.

"A Solution for the Priority Queue Problem of Deadline-Ordered Service Disciplines," N.R. Figueira, IEEE International Conference on Computer Communications and Networks, Sep. 22-25, 1997, pp. 320-325.

"*Data-Over-Cable Service Interface Specification SP-RFI-I05-99-1105*", Cable Television Laboratories, Inc., 1999, pp. ii to 202.

"*Data-Over-Cable Service Interface Specification SP-RFIv1.1-I06-001215*", Cable Television Laboratories, Inc., 1999, 2000, pp. ii to 432.

"Radio Frequency Interface Specification (Interim Specification) SP-RFI-I04-980724", MCNS Holdings, L.P., 1997, pp. ii to 196.

"Radio Frequency Interface Specification (Interim Specification) SP-RFI-I05-991105", MCNS Holdings, L.P., 1999, pp. ii to 202.

"Radio Frequency Interface Specification (Interim Specification) SP-RFIv1.1-I06-001215", MCNS Holdings, L.P., 2000, pp. ii to 432.

Droms, R., *Dynamic Host Configuration Protocol*, Request for Comments 1541, Oct. 1993, pp. 1 to 31.

RFC 791, *Internet Protocol, DARPA Internet Program Protocol Specification*, Sep. 1981, pp. 1-37.

Postel, J., *Internet Protocol, DARPA Internet Program Protocol Specification*, RFC 792, Sep. 1981, pp. 1-14.

Postel, J., *User Datagram Protocol*, RFC 768, Aug. 28, 1980, pp. 1-3.

RFC 793, *Transmission Control Protocol, DARPA Internet Program Protocol Specification*, Sep. 1981, pp. 1-68.

Case, J. et al., *A Simple Network Management Protocol (SNMP)*, RFC 1157, May 1990, pp. 1-26.

Sollins, K., *The TFTP Protocol (Revision 2)*, RFC 1350, Jul. 1992, pp. 1-9.

Alexander, S., *DHCP Options and BOOTP Vendor Extensions*, RFC 2132, Mar. 1997, pp. 1-37.

"Radio Frequency Interface Specification (Interim Specification) SP-RFIv1.1-I03-991105", MCNS Holdings, L.P., 1999, pp. Ii to 366.

* cited by examiner

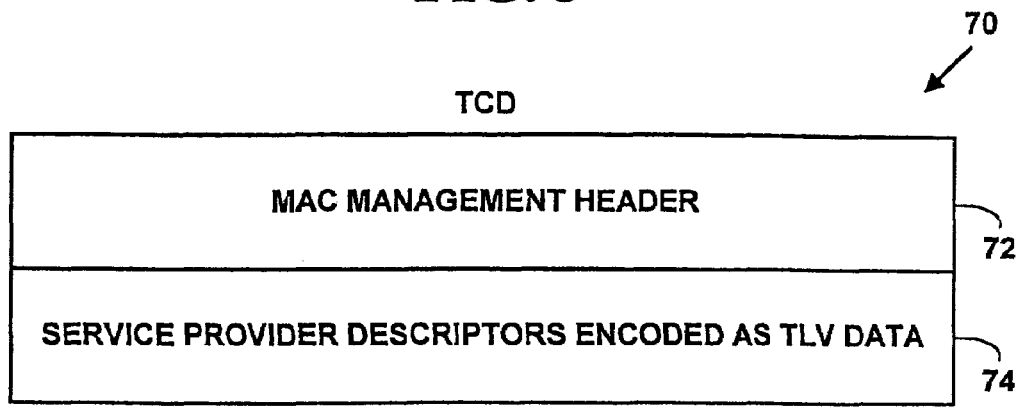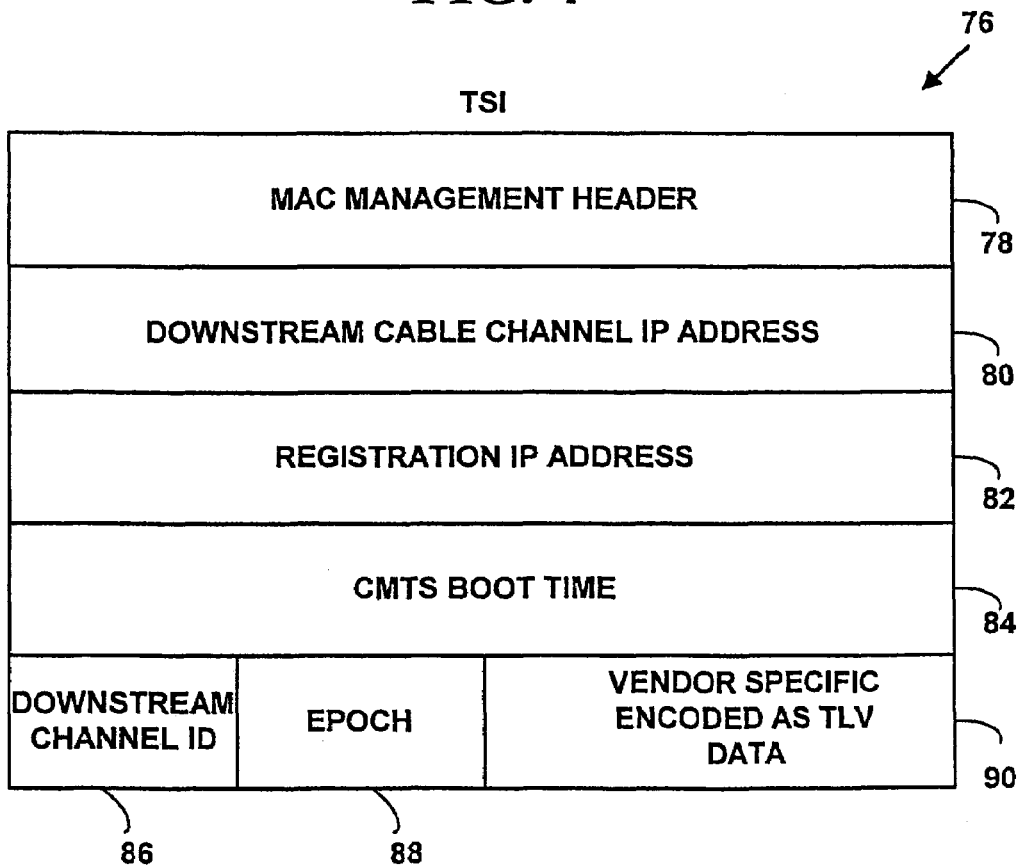

SYSTEM AND METHOD FOR CALIBRATING POWER LEVEL DURING INITIAL RANGING OF A NETWORK CLIENT DEVICE

FIELD OF THE INVENTION

This present invention relates to communications between network devices in computer networks. More specifically, it relates to a system and method for adjusting power during initial ranging of network client devices such as cable modems.

BACKGROUND OF THE INVENTION

Cable television networks such as those provided by Comcast Cable Communications, Inc., of Philadelphia, Pa., Cox Communications of Atlanta, Ga., Tele-Communications, Inc., of Englewood Colo., Time-Warner Cable, of Marietta Ga., Continental Cablevision, Inc., of Boston Mass., and others provide cable television services to a large number of subscribers over a large geographical area. The cable television networks typically are interconnected by cables such as coaxial cables or a Hybrid Fiber/Coaxial ("HFC") cable system which have data rates of about 10 Mega-bits-per-second ("Mbps") to about 30+Mbps.

The Internet, a world-wide-network of interconnected computers, provides multi-media content including audio, video, graphics and text that typically requires a large bandwidth for downloading and viewing. Most Internet Service Providers ("ISPs") allow customers to connect to the Internet via a serial telephone line from a Public Switched Telephone Network ("PSTN") at data rates including 14,400 bps, 28,800 bps, 33,600 bps, 56,000 bps and others that are much slower than the about 10 Mbps to about 30+Mbps available on a coaxial cable or HFC cable system on a cable television network.

With the explosive growth of the Internet, many customers have desired to use the larger bandwidth of a cable television network to connect to the Internet and other computer networks. Cable modems, such as those provided by 3Com Corporation, of Santa Clara, Calif., Motorola Corporation, of Arlington Heights, Ill., Hewlett-Packard Co., of Palo Alto, Calif., Scientific-Atlanta, of Norcross, Ga., General Instruments, of Horsham, Pa., and others offer customers higher-speed connectivity to the Internet, an Intranet, Local Area Networks ("LANs") and other computer networks via cable television networks. These cable modems currently support a data connection to the Internet and other computer networks via a cable television network with a data rate of up to about 30+Mbps, which is a much larger data rate than can be supported by a modem used over a serial telephone line.

However, many cable television networks provide only unidirectional cable systems, supporting only a "downstream" cable data path. A downstream data path is the flow of data from a cable system "headend" to a customer. A cable system headend is a central location in the cable television network that is responsible for sending cable signals in the downstream direction. A return data path via a telephone network (i.e., a "telephony return"), such as, a Public Switched Telephone Network provided by AT&T, GTE, Sprint, MCI and others, is typically used for an "upstream" data path. An upstream data path is the flow of data from the customer back to the cable system headend. A cable television system with an upstream connection to a telephony network is called a "data-over-cable system with telephony return."

An exemplary data-over-cable system with telephony return includes customer premise equipment (e.g., a customer computer), a cable modem, a cable modem termination system, a cable television network, a Public Switched Telephone Network, a telephony remote access concentrator and a data network (e.g., the Internet). The cable modem termination system and the telephony remote access concentrator together are called a "telephony return termination system."

The cable modem termination system receives data packets from the data network and transmits them downstream via the cable television network to a cable modem attached to the customer premise equipment. The customer premise equipment sends response data packets to the cable modem, which sends response data packets upstream via Public Switched Telephone Network to the telephony remote access concentrator, which sends the response data packets back to the appropriate host on the data network.

In a two-way cable system without telephony return, the customer premise equipment sends response data packets to the cable modem, which sends the data packets upstream via the cable television network to the cable modem termination system. The cable modem termination system sends the data packets to appropriate hosts on the data network. The cable modem termination system sends the response data packets back to the appropriate cable modem. Currently, as a cable modem is initialized in a data-over-cable system, it registers with a cable modem termination system to allow the cable modem to receive data over a cable television connection and from a data network (e.g., the Internet or an Intranet). The cable modem forwards configuration information it receives in a configuration file during initialization to the cable modem termination system as part of a registration request message. A cable modem also helps initialize and register any attached customer premise equipment with the cable modem termination system.

A cable modem termination system in a data-over-cable system typically manages connections to tens of thousands of cable modems. Most of the cable modems are attached to host customer premise equipment such as a customer computer. To send and receive data to and from a computer network like the Internet or an Intranet, a cable modem and customer premise equipment and other network devices have a network address dynamically assigned on the data-over-cable system.

Many data-over-cable systems use a Dynamic Host Configuration Protocol ("DHCP") as a standard messaging protocol to dynamically allocate network addresses such as Internet Protocol ("IP") addresses. As is known in the art, the Dynamic Host Configuration Protocol is a protocol for passing configuration information to the network devices on a network. The Internet Protocol is an addressing protocol designed to route traffic within a network or between networks.

The cable modem makes an Internet Protocol connection to the cable modem termination system so that Internet Protocol data received on the cable modem termination system from the data network can be forwarded downstream to the customer premise equipment via the cable network and the cable modem. Once an Internet Protocol address is obtained on the cable modem termination system, the cable modem obtains the name of a configuration file used to complete initialization. The cable modem downloads a configuration file from a central location in the data-over-cable system using a Trivial File Transfer Protocol (TFTP) server. As is known in the art, Trivial File Transfer Protocol is a very simple protocol used to transfer files, where any error during file transfer typically causes a termination of the file transfer.

There are a host of initialization steps that are typically performed to allow the network client device such as a cable modem to receive data over a cable television connection from a data network. A set of parameters must be initialized before the cable modem can be declared operational. Some of these parameters include synchronization, authorization, local address assignment, ranging and power calibration, assignment of default upstream and downstream channels and assignment of encryption information.

Ranging is a process by which the headend determines the round-trip delay of data destined to a specific customer premise equipment or network termination point. It is a process of acquiring the correct timing offset such that the cable modem's transmissions are aligned to the correct mini-slot boundary. Accurate ranging of network client devices permits a Time Division Modulation Application (TDMA) like slotted channel mechanism on the upstream. Further, less guard time is required between network client devices such as a cable modem with precise ranging. All network client device transmitters along the entire length of the cable television system are aligned in terms of timing such that, if every network client device on the channel began transmitting on the upstream channel, the first symbol of each would arrive at the headend receiver at exactly the same instant the first symbol of the downstream frame was leaving the headend transmitter.

During the ranging process, each network client device is transmitter downloaded with a transmit timing offset value. IEEE P802.14 specifies a maximum cable television length of 50 miles (80 km). The ranging process has the effect of positioning each network termination point in a virtual timing space such that all network client devices appear to be within zero propagation delay of the headend. For example, using the difference between its current time and a cable modem's local time at the time a frame is transmitted, the headend can determine a time correction value to be assigned uniquely to each cable modem. The INVITATION and INVITATION_RESPONSE messages between a cable modem and a headend exchange all the data necessary to perform ranging, but additional ranging exchanges may be performed on any cable modem via the RANGE_REQUEST message. The range and power calibration message from the headend to a cable modem is transmitted by the headend to a single cable modem on the cable modem's downstream channel after it has transmitted a local address assign message to the same cable modem. It contains the range offset value and the power control value and is addressed to the cable modem's local address. This message may be transmitted to the same cable modem in response to any received upstream slot to cause it to adjust its power and range offset.

The headend also determines a power level adjustment value to guarantee optimal performance. However, the Data-Over-Cable Service Interface Specification (DOCSIS) provides no guidance as to how the power level should be adjusted for successive initial ranging attempts. The specification only specifies a dynamic range from 8 dBmV to 58 dBmV with power level control in 1 dB increments. One solution may be to use linearly increasing increments in power to cover a transmitter dynamic range. The problem with this approach is the considerable length of time required by a cable modem to register with the cable modem termination system. Thus, there is still a need to implement a method to calibrate or adjust the power level of a cable modem transmitter that reduces the initial ranging time to cover the entire cable modem transmitter dynamic range.

SUMMARY OF THE INVENTION

The system and method of the present invention facilitates communications between a network client device such as a cable modem and a network device such as a cable modem termination system.

In accordance with a preferred embodiment, the method for establishing communications between a cable modem and the cable modem termination system includes dividing the dynamic range of the cable modem transmitter into different regions. In a preferred embodiment, the dynamic range of the cable modem transmitter is divided by the dynamic range of the cable modem termination system receiver. The method for establishing communications further includes, attempting one or more initial ranging in each of the different regions, and determining if a range response message is received from the cable modem termination system. If a response is not received, the method further includes adjusting the power level and reattempting one or more initial ranging in each region till a range response message is received from the cable modem termination system. Once a range response message is received, the initial ranging process is complete.

The foregoing and other features and advantages of the system and method for calibrating power level during initial ranging of a network client device will be apparent from the following more particular description of preferred embodiments of the system and method as illustrated in the accompanying drawings in which like reference characters refer to the same parts throughout the different views.

BRIEF DESCRIPTION OF THE DRAWINGS

Preferred embodiments of the present invention are described with reference to the following drawings, wherein:

FIG. 3 is a block diagram illustrating a Telephony Channel Descriptor message structure;

FIG. 4 is a block diagram illustrating a Termination System Information message structure;

DETAILED DESCRIPTION OF PREFERRED EMBODIMENTS

The present invention is directed to a system and method for adjusting power level during a cable modem initial ranging in a data-over-cable system. The system and method of the present invention includes communications between a network device such as, an access router or a cable modem termination system and a network client device such as, but not limited to, a cable modem.

Data-Over-Cable System

Figure 1:
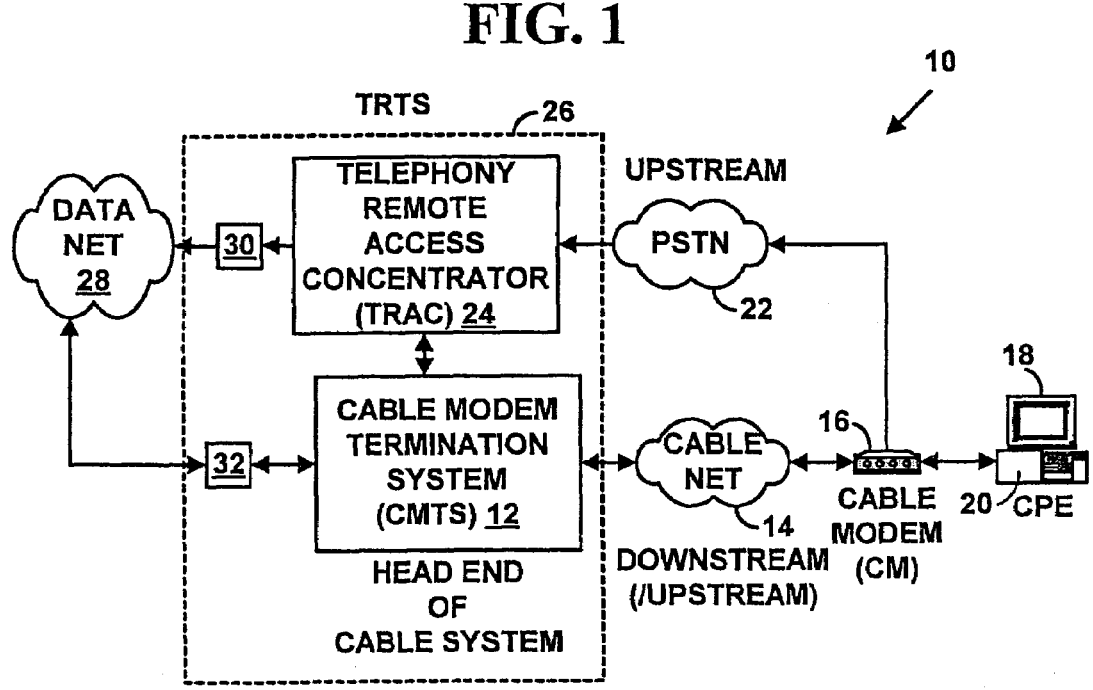
FIG. 1 is a diagram illustrating a cable modem system with telephony return.

FIG. 1 is a block diagram illustrating an exemplary data-over-cable system 10. Most cable providers known in the art predominately provide unidirectional cable systems, supporting only a "downstream" data path. A downstream data path is the flow of data from a cable television network "headend" to customer premise equipment, for example, a customer's personal computer. A cable television network headend is a central location that is responsible for sending cable signals in a downstream direction. A return path via a telephony network ("telephony return") is typically used for an "upstream" data path in uni-directional cable systems. An upstream data path is the flow of data from customer premise equipment back to the cable television network headend.

However, data-over-cable system 10 of the present invention may also provide a bi-directional data path (i.e., both downstream and upstream) without telephony return as is also illustrated in FIG. 1. The present invention is not limited to a data-over-cable system 10 with telephony return. In a data-over cable system without telephony return, customer premise equipment or a cable modem has an upstream connection to the cable modem termination system via a cable television connection, a wireless connection, a satellite connection, or a connection via other technologies to send data upstream to the cable modem termination system.

Data-over-cable system 10 includes a Cable Modem Termination System ("CMTS") 12 connected to a cable television network 14, hereinafter cable network 14. FIG. 1 illustrates one CMTS 12. However, data-over-cable system 10 can include multiple CMTS 12. In one preferred embodiment of the present invention, the CMTS 12 is a Total Control hub by 3Com Corporation of Santa Clara, Calif., with a cable modem termination unit. A Total Control hub is a chassis with multiple networking cards connected by a common bus. An exemplary Total Control hub is described in U.S. Pat. No. 5,528,595, granted to Dale M. Walsh et al., and the entire teaching of which is incorporated herein by reference. However, the CMTS 12 could also be another network server including those by Lucent Technologies of Murray Hill, N.J., Livingston Enterprises, Inc. of Pleasanton, Calif., Ascend Communications of Alameda, Calif., Cisco Systems, Inc., of San Jose, Calif. and others.

The cable network 14 includes cable television networks such as those provided by Comcast Cable Communications, Inc., of Philadelphia, Pa., Cox Communications, or Atlanta, Ga., Tele-Communications, Inc., of Englewood Colo., Time-Warner Cable, of Marietta, Ga., Continental Cablevision, Inc., of Boston, Mass., and others. The cable network 14 is connected to a Cable Modem ("CM") 16 with a downstream cable connection. The CM 16 is any cable modem, such as, those provided by 3Com Corporation of Santa Clara, Calif., Motorola Corporation of Arlington Heights, Ill., Hewlett-Packard Co. of Palo Alto, Calif., Scientific-Atlanta, of Norcross, Ga., General Instruments of Horsham, Pa., and others. FIG. 1 illustrates one CM 16. However, in a typical data-over-cable system, tens or hundreds of thousands of the CMs 16 are connected to the CMTS 12.

The CM 16 is connected to Customer Premise Equipment ("CPE") 18 such as a personal computer system via a Cable Modem-to-CPE Interface ("CMCI") 20.

One CPE 18 is illustrated in FIG. 1. However, the CM 16 may have multiple CPEs 18 attached. In one preferred embodiment of the present invention, the CM 16 is connected to a Public Switched Telephone Network ("PSTN") 22 with an upstream telephony connection. The PSTN 22 includes those public switched telephone networks provided by AT&T, Regional Bell Operating Companies (e.g., Ameritech, U.S. West, Bell Atlantic, Southern Bell Communications, Bell South, NYNEX, and Pacific Telesis Group), GTE, Sprint, MCI and others. The upstream telephony connection is any of a standard telephone line connection, Integrated Services Digital Network ("ISDN") connection, Asymmetric Digital Subscriber Line ("ADSL") connection, a wireless connection or other telephony connection. The PSTN 22 is connected to a Telephony Remote Access Concentrator ("TRAC") 24.

In another preferred embodiment of the present invention, in a data-over cable system 10 without telephony return, the CM 16 has an upstream connection to the CMTS 12 via a cable television connection, a wireless connection, a satellite connection, or a connection via other technologies to send data upstream outside of the telephony return path. An upstream cable television connection via cable network 14 is also illustrated in FIG. 1. In such an embodiment, the CMTS 12 may also provide data streams involving voice, video or data information to a CM 16, or CPE 18 from the PSTN 22 even when a telephony return path is not used.

FIG. 1 illustrates a telephony modem integral to the CM 16. In another embodiment of the present invention, the telephony modem is a separate modem unit external to the CM 16 used specifically for connecting with the PSTN 22. A separate telephony modem includes a connection to the CM 16 for exchanging data. In yet another embodiment of the present invention, the CM 16 includes functionality to connect only to the cable network 14 and receives downstream signals from the cable network 14 and sends upstream signals to the cable network 14 without using the telephony return path. The present invention is not limited to cable modems used in a data-over-cable system with telephony return.

In one preferred embodiment of the present invention of the telephony return, the TRAC 24 is a Total Control Telephony Hub by 3Com Corporation of Santa Clara, Calif. However, the TRAC 24 could also be a telephony hub including those by Lucent Technologies of Murray Hill, N.J., Livingston Enterprises, Inc. of Pleasanton, Calif., Ascend Communications of Alameda, Calif. and others.

The CMTS 12 and the TRAC 24 may be at a "headend" of cable system 10, or the TRAC 24 may be located elsewhere and have routing associations to the CMTS 12. The CMTS 12 and the TRAC 24 together are called a "Telephony Return Termination System" ("TRTS") 26. The TRTS 26 is illustrated by a dashed box in FIG. 1. The CMTS 12 and the TRAC 24 make up the TRTS 26 whether or not they are located at the headend of cable network 14. The TRAC 24 may be located in a different geographic location from the CMTS 12. Content servers, operations servers, administrative servers and maintenance servers used in data-over-cable system 10 (not shown in FIG. 1) may also be in different locations. Access points to the data-over-cable system are connected to one or more of the CMTS 12, or cable headend access points. Such configurations may be "one-to-one", "one-to-many," or "many-to-many," and may be interconnected to other Local Area Networks ("LANs") or Wide Area Networks ("WANs").

The TRAC 24 is connected to a data network 28, for example, the Internet, an Intranet or other LAN by a TRAC-Network System Interface 30 ("TRAC-NSI"). The CMTS 12 is connected to data network 28 by a CMTS-Network System Interface ("CMTS-NSI") 32. The CMTS 12 may send and receive data to/from a CM 16 or a CPE 18 via the PSTN 22 even if telephony return is not used. The present invention is not limited to data-over-cable system 10 illustrated in FIG. 1, and more or fewer components, connections and interfaces could also be used. The present invention may also be used in a data-over-cable system 10 with or without telephony return. It should be noted that though FIG. 1 is described with respect to particular network elements, such as, a cable modem which is one of a network client device, a CMTS which is one of a network device that interfaces with a network address server, such as, a DHCP server which sends a network address allocation message to a network client device.

Network Device Protocol Stack

Figure 2:
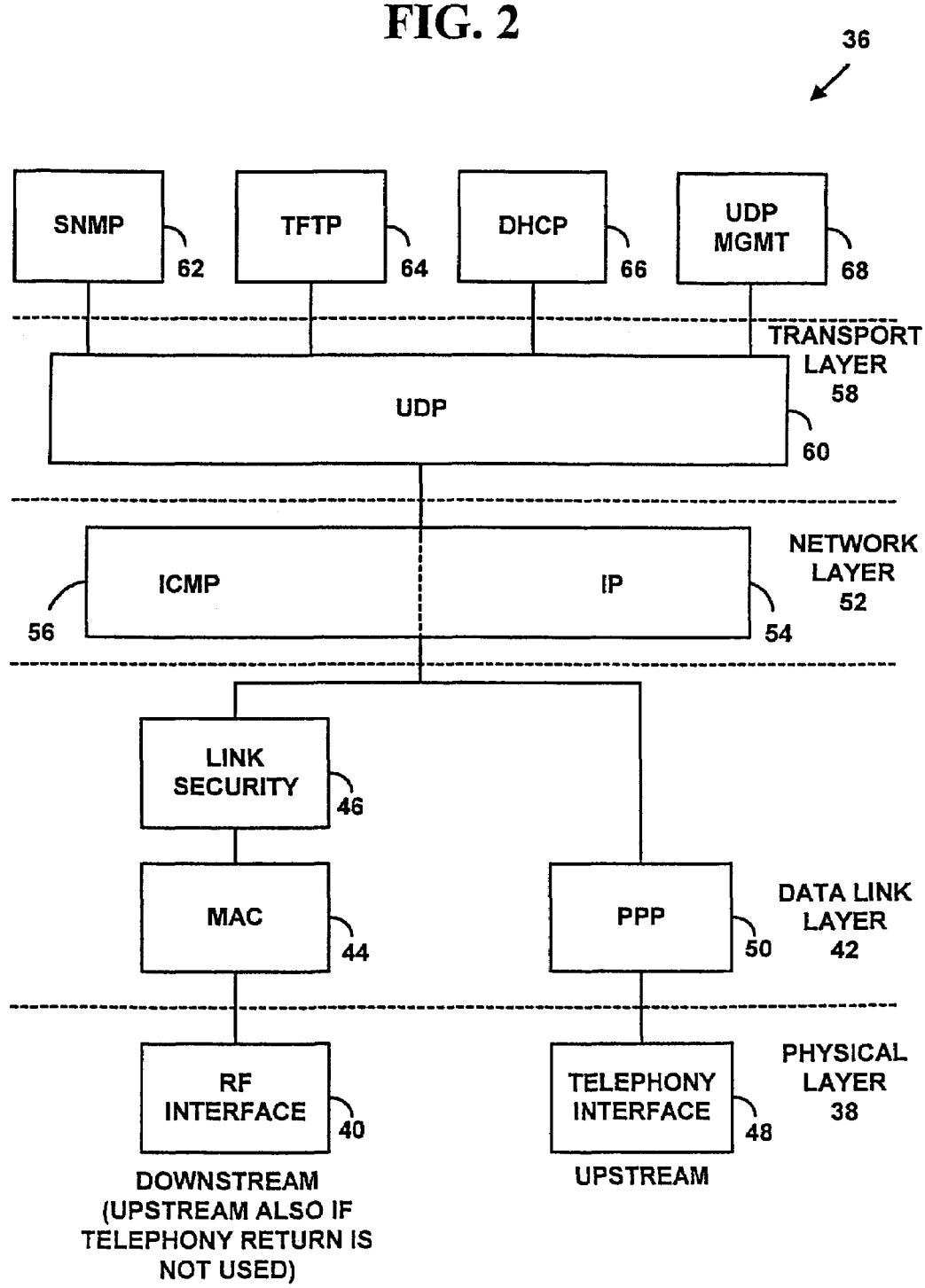
FIG. 2 is a block diagram illustrating a protocol stack for a cable modem.

FIG. 2 is a block diagram illustrating a protocol stack 36 for network devices in data-over-cable system 10. In one exemplary preferred embodiment of the present invention, network devices in the data-over-cable system 10 are compliant with Data-Over-Cable-Service-Interface-Specification ("DOCSIS") standards from the Multimedia Cable Network Systems ("MCNS"), the entire teachings of which are incorporated herein by reference. The DOCSIS standards can be found on the World Wide Web at the Universal Resource Locator ("URL") "www.cablemodem.com." However, other standards may also be used and the present invention is not limited to network devices compliant with DOCSIS and MCNS. However FIG. 2 illustrates the downstream and upstream protocols used, for example, in the CM 16. As is known in the art, the Open System Interconnection ("OSI") model is used to describe computer networks. The OSI model consists of seven layers including from lowest-to-highest, a physical, data-link, network, transport, session, presentation and application layer. The physical layer transmits bits over a communication link. The data link layer transmits error free frames of data. The network layer transmits and routes data packets.

For downstream data transmission, network devices including the CM 16 are connected to the cable network 14 in a physical layer 38 via a Radio Frequency ("RF") Interface 40. In a preferred embodiment of the present invention, RF Interface 40 has an operation frequency range of 50 Mega-Hertz ("MHz") to 1 Giga-Hertz ("GHz") and a channel bandwidth of 6 MHz. However, other operation frequencies may also be used and the present invention is not limited to these frequencies. The RF interface 40 uses a signal modulation method, such as Quadrature Amplitude Modulation ("QAM"). As is known in the art, QAM is used as a means of encoding digital information over radio, wire, or fiber optic transmission links. QAM is a combination of amplitude and phase modulation and is an extension of multiphase phase-shift-keying. QAM can have any number of discrete digital levels typically including 4, 16, 64 or 256 levels. In one embodiment of the present invention, QAM-64 is used in the RF interface 40. However, other operating frequencies and modulation methods could also be used (e.g., Quadrature Phase Shift Keying ("QPSK") modulation). For more information on the RF interface 40 see the Institute of Electrical and Electronic Engineers ("IEEE") standard 802.14 for cable modems, the entire teaching of which is incorporated herein by reference. IEEE standards can be found on the World Wide Web at the URL "www.ieee.org." However, other RF interfaces 40 could also be used and the present invention is not limited to IEEE 802.14, for example, RF interfaces from MCNS and others could also be used.

Above the RF interface 40 in a data link layer 42 is a Medium Access Control ("MAC") layer 44. As is known in the art, the MAC layer 44 controls access to a transmission medium via physical layer 38. For more information on the MAC layer protocol 44 see IEEE 802.14 for cable modems. However, other MAC layer protocols 44 could also be used and the present invention is not limited to IEEE 802.14 MAC layer protocols, for example, MCNS MAC layer protocols and others could also be used.

Above the MAC layer 44 is an optional link security protocol stack 46. The link security protocol stack 46 prevents unauthorized users from making a data connection from cable network 14. The RF interface 40 and the MAC layer 44 can also be used for an upstream cable connection in a data-over-cable system 10 without telephony return.

For upstream data transmission with telephony return, the CM 16 is connected to the PSTN 22 in physical layer 38 via telephony interface 48. The International Telecommunications Union-Telecommunication Standardization Sector ("ITU-T", formerly known as the CCITT) defines standards for communication devices identified by "V.xx" series where "xx" is an identifying number. ITU-T standards can be found on the World Wide Web at the URL "www.itu.ch."

In one embodiment of the present invention, ITU-T V.34 is used as telephony interface 48. As is known in the art, ITU-T V.34 is commonly used in the data link layer for modem communications and currently allows data rates as high as 33,600 bits-per-second ("bps"). For more information see the ITU-T V.34 standard. However, modem interfaces, for example, V.90 or other telephony interfaces could also be used. For example, an Asymmetric Digital Subscriber Link ("ADSL"), an Integrated Services Digital Network ("ISDN") or a wireless telephony interface could also be used for the telephony interface 48.

Above the telephony interface 48, in the data link layer 42, is a Point-to-Point Protocol ("PPP") layer 50, hereinafter PPP 50. As is known in the art, PPP 50 is used to encapsulate network layer datagrams over a serial communications link. For more information on PPP 50 see Internet Engineering Task Force ("IETF") Request for Comments ("RFC"), RFC-1661, RFC-1662 and RFC-1663, the entire teachings of which are incorporated herein by reference. Information for IETF RFCs can be found on the World Wide Web at URLs "ds.internic.net" or "www.ietf.org."

Above both the downstream and upstream protocol layers in a network layer 52 is an Internet Protocol ("IP") layer 54. IP layer 54, hereinafter IP 54, roughly corresponds to OSI layer 3, the network layer, but is typically not defined as part of the OSI model. As is known in the art, IP 54 is a routing protocol designed to route traffic within a network or between networks. For more information on IP 54 see, RFC-791, the entire teaching of which is incorporated herein by reference.

Internet Control Message Protocol ("ICMP") layer 56 is used for network management. The main functions of ICMP layer 56, hereinafter ICMP 56, include error reporting, reachability testing, for example, "pinging", congestion control, route-change notification, performance, subnet addressing and others. Since IP 54 is an unacknowledged protocol, datagrams may be discarded and ICMP 56 is used for error reporting. For more information on ICMP 56 see, RFC-792, the entire teaching of which is incorporated herein by reference.

Above IP 54 and ICMP 56 is a transport layer 58 with a User Datagram Protocol layer 60 ("UDP"). UDP layer 60, hereinafter UDP 60, roughly corresponds to OSI layer 4, the transport layer, but is typically not defined as part of the OSI model. As is known in the art, UDP 60 provides a connectionless mode of communications with datagrams. For more information on UDP 60 see RFC-768, the entire teaching of which is incorporated herein by reference. Transmission Control Protocol ("TCP") may also be used in the transport layer 58. For more information on TCP see RFC-793, the entire teaching of which is incorporated herein by reference.

Above the network layer are a Simple Network Management Protocol ("SNMP") layer 62, Trivial File Transfer Protocol ("TFTP") layer 64, Dynamic Host Configuration Protocol ("DHCP") layer 66 and a UDP manager 68. SNMP layer 62 is used to support network management functions. For more information on SNMP layer 62 see RFC-1157, the entire teachings of which are incorporated herein by reference. TFTP layer 64 is a file transfer protocol used to download files and configuration information. For more information on TFTP layer 64 see RFC-1350, the entire teaching of which is incorporated herein by reference. The DHCP layer 66 is a protocol for passing configuration information to hosts on an IP 54 network. For more information on the DHCP layer 66 see, RFC-1541, RFC-2131 and RFC-2132, the entire teachings of which are incorporated herein by reference. UDP manager 68 distinguishes and routes packets to an appropriate service, for example, a virtual tunnel. More or few protocol layers could also be used with data-over-cable system 10.

The CM 16 supports transmission and reception of IP 54 datagrams as specified by RFC-791. The CMTS 12 and the TRAC 24 may also perform filtering of IP 54 datagrams. The CM 16 is also configurable for IP 54 datagram filtering to restrict the CM 16 and the CPE 18 to the use of only their assigned IP 54 addresses. The CM 16 is configurable for IP 54 datagram UDP 60 port filtering, for example, deep filtering.

The CM 16 forwards IP 54 datagrams destined to an IP 54 unicast address across the cable network 14 or the PSTN 22. Some routers have security features intended to filter out invalid users who alter or masquerade packets as if sent from a valid user. Since routing policy is under the control of network operators, such filtering is a vendor specific implementation. For example, dedicated interfaces (i.e., Frame Relay) may exist between the TRAC 24 and/or the CMTS 12 which preclude filtering, or various forms of virtual tunneling and reverse virtual tunneling could be used to virtually source upstream packets from the CM 16. For more information on virtual tunneling, see Level 2 Tunneling Protocol ("L2TP") or Point-to-Point Tunneling Protocol ("PPTP") in IETF draft documents by Kory Hamzeh (IETF draft documents are precursors to IETF RFCs and are works in progress), the entire teachings of which are incorporated herein by reference.

The CM 16 also forwards IP 54 datagrams destined to an IP 54 multicast address across the cable network 14 or the PSTN 22. The CM 16 is configurable to keep IP 54 multicast routing tables and to use group membership protocols. The CM 16 is also capable of IP 54 tunneling upstream through the telephony path. A CM 16 that wants to send a multicast packet across a virtual tunnel will prepend another IP 54 header, set the destination address in the new header to be the unicast address of the CMTS 12 at the other end of the tunnel, and set the IP 54 protocol field to be four, which means the next protocol is IP 54.

The CMTS 12 at the other end of the virtual tunnel receives the packet, strips off the encapsulating IP 54 header, and forwards the packet as appropriate. A broadcast IP 54 capability is dependent upon the configuration of the direct linkage, if any, between the TRAC 24 and the CMTS 12. The CMTS 12, the CM 16, and the TRAC 24 are capable of routing IP 54 datagrams destined to an IP 54 broadcast address which is across the cable network 14 or the PSTN 22 if so configured. The CM 16 is configurable for IP 54 broadcast datagram filtering.

An operating environment for the CMTS 12, the CM 16, the CPE 18, the TRAC 24 and other network devices of the present invention includes a processing system with at least one high speed processing unit and a memory system. In accordance with the practices of persons skilled in the art of computer programming, the present invention is described below with reference to acts and symbolic representations of operations or instructions that are performed by the processing system, unless indicated otherwise. Such acts and operations or instructions are sometimes referred to as being "computer-executed", or "processing unit executed."

It will be appreciated that the acts and symbolically represented operations or instructions include the manipulation of electrical signals by the processing unit. An electrical system with data bits causes a resulting transformation or reduction of the electrical signal representation, and the maintenance of data bits at memory locations in the memory system to thereby reconfigure or otherwise alter the processing unit's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or non-volatile mass storage system readable by the processing unit. The computer readable medium includes cooperating or interconnected computer readable media, which exist exclusively on the processing system or is distributed among multiple interconnected processing systems that may be local or remote to the processing system.

Initialization of a Cable Modem

When the CM 16 is initially powered on, if telephony return is being used, the CM 16 will receive a Telephony Channel Descriptor ("TCD") from the CMTS 12 that is used to provide dialing and access instructions on downstream channels via cable network 14. Information in the TCD is used by the CM 16 to connect to the TRAC 24. The TCD is transmitted as a MAC management message with a management type value of TRI_TCD at a periodic interval for example, every 2 seconds. To provide for flexibility, the TCD message parameters are encoded in a Type/Length/ Value ("TLV") form. However, other encoding techniques could also be used.

FIG. 3 is a block diagram illustrating a TCD message structure 70 with MAC management header 72 and Service Provider Descriptor(s) ("SPD") 74 encoded in TLV format. SPDs 74 are compound TLV encoding that define telephony physical-layer characteristics that are used by the CM 16 to initiate a telephone call. The SPD 74 is a TLV-encoded data structure that includes sets of dialing and access parameters for the CM 16 with telephony return. The SPD 74 is contained within TCD message 70. There may be multiple SPD 74 encoding within a single TCD message 70. There is at least one SPD 74 in the TCD message 70. The SPD 74 parameters are encoded as SPD-TLV tuples. The SPD 74 includes the parameters shown in Table 1 and may contain optional vendor specific parameters. However, fewer or more parameters could also be used in the SPD 74.

TABLE 1

| SPD 74 Parameter | Description |
| --- | --- |
| Factory Default Flag | Boolean value, if TRUE(1), indicates a SPD which should be used by the CM 16. |
| Service Provider Name | This parameter includes the name of a service provider. Format is standard ASCII string composed of numbers and letters. |
| Telephone Numbers | These parameters contain telephone numbers that the CM 16 uses to initiate a telephony modem link during a login process. Connections are attempted in ascending numeric order (i.e., Phone Number 1, Phone Number 2 . . . ). The SPD includes a valid telephony dial string as the primary dial string (Phone Number 1), secondary dial-strings are optional. Format is ASCII string(s) composed of: any sequence of numbers, pound "#" and star "*" keys and a comma character "," that is used to indicate a two second pause in dialing. |
| Connection Threshold | The number of sequential connection failures before indicating connection failure. A dial attempt that does not result in an answer and connection after no more than ten rings is considered a failure. The default value is one. |
| Login User Name | This includes a user name the CM 16 will use in an authentication protocol over the telephone link during the initialization procedure. Format is a monolithic sequence of alphanumeric characters in an ASCII string composed of numbers and letters. |
| Login Password | This includes a password that the CM 16 will use during authentication over a telephone link during the initialization procedure. Format is a monolithic sequence of alphanumeric characters in an ASCII string composed of numbers and letters. |
| DHCP 66 Authenticate | Boolean value, reserved to indicate that the CM 16 uses a specific indicated DHCP 66 Server (see next parameter) for a DHCP 66 Client and BOOTP Relay Process when TRUE (one). The default is FALSE (zero) which allows any DHCP 66 Server. |
| DHCP 66 Server | IP 54 address value of a DHCP 66 Server the CM 16 uses in the DHCP 66 Client and BOOTP Relay Process when the DHCP 66 Authenticate attribute is TRUE(1) and this attribute is present. The default value is integer zero. |
| RADIUS Realm | The realm name is a string that defines a Remote Authentication Dial In User Service ("RADIUS") server domain. Format is a monolithic sequence of alphanumeric characters in an ACSII string composed of numbers and letters. |
| PPP 50 Authentication | This parameter instructs the telephone modem which authentication procedure to perform over the telephone link. |
| Demand Dial Timer | This parameter indicates time (in seconds) of inactive networking time that will be allowed to elapse before hanging up a telephone connection at CM 16. If this optional parameter is not present, or set to zero, then the demand dial feature is not activated. The default value is zero. |
| Vendor Specific Extensions | Optional vendor specific extensions. |

A Termination System Information ("TSI") message is transmitted by the CMTS 12 at periodic intervals (e.g., every 2 seconds) to report CMTS 12 information to the CM 16 whether or not telephony return is used. The TSI message is transmitted as a MAC management message. The TSI provides a CMTS 12 boot record in a downstream channel to the CM 16 via cable network 14. Information in the TSI is used by the CM 16 to obtain information about the status of the CMTS 12. The TSI message has a MAC management type value of TRI_TSI.

FIG. 4 is a block diagram of a TSI message structure 76. The TSI message structure 76 includes a MAC management header 78, a downstream channel IP address 80, a registration IP address 82, a CMTS 12 boot time 84, a downstream channel identifier 86, an epoch time 88 and vendor specific TLV encoded data 90.

A description of the fields of TSI message 76 are shown in Table 2. However, fewer or more fields could also be used in TSI message 76.

TABLE 2

| TSI 76 Parameter | Description |
| --- | --- |
| Downstream Channel IP Address 80 | This field includes an IP 54 address of the CMTS 12 available on the downstream channel this message arrived on. |
| Registration IP Address 82 | This field includes an IP 54 address the CM 16 sends its registration request messages to. This address may be the same as the Downstream Channel IP 54 address. |
| CMTS Boot Time 84 | Specifies an absolute-time of a CMTS 12 recorded epoch. The clock setting for this epoch uses the current clock time with an unspecified accuracy. Time is represented as a 32 bit binary number. |
| Downstream Channel ID 86 | A downstream channel on which this message has been transmitted. This identifier is arbitrarily chosen by CMTS 12 and is unique within the MAC 44 layer. |
| Epoch 88 | An integer value that is incremented each time the CMTS 12 is either re-initialized or performs address or routing table flush. |
| Vendor Specific Extensions 90 | Optional vendor extensions may be added as TLV encoded data. |

If telephony return is being used, after receiving the TCD message 70 and the TSI message 76, the CM 16 continues to establish access to data network 28 (and resources on the network) by first dialing into the TRAC 24 and establishing a telephony PPP 50 session. Upon the completion of a successful PPP 50 connection, the CM 16 performs PPP 50 Link Control Protocol ("LCP") negotiation with the TRAC 24.

Once LCP negotiation is complete, the CM 16 requests Internet Protocol Control Protocol ("IPCP") address negotiation for an upstream telephony return path. For more information on IPCP see RFC-1332, the entire teaching of which is incorporated herein by reference. During IPCP negotiation, the CM 16 negotiates, via PPP 50, an IP 54 address with the TRAC 24 for sending IP 54 data packet responses back to data network 28 via the TRAC 24.

When the CM 16 has established an upstream IP 54 link to TRAC 24, it begins "upstream" communications to the CMTS 12 via the DHCP layer 66 to complete a virtual data connection by attempting to discover network host interfaces available on the CMTS 12, for example, IP 54 host interfaces for a virtual IP 54 connection. The virtual data connection allows the CM 16 to receive data from data network 28 via the CMTS 12 and cable network 14, and send return data to data network 28 via TRAC 24 and PSTN 22. The CM 16 must first determine an address of a network host interface, for example, an IP 54 interface associated with the CMTS 12 that can be used by data network 28 to send data to the CM 16. In one preferred embodiment of the present invention, the CM 16 has only a downstream cable connection from the CMTS 12 and will obtain a connection address to the data network 28 using an upstream telephony connection to the TRAC 24. In another preferred embodiment of the present invention, the CM 16 will obtain a connection address to the cable network using an upstream cable connection to the CMTS 12.

An exemplary data path through cable system 10 is illustrated in Table 3. However other data paths could also be used and the present invention is not limited to the data paths shown in Table 3. For example, the CM 16 may send data upstream back through the cable network 14 (e.g., the CM 16 to cable network 14 to the CMTS 12 and to the data network 28 through CMTS NSI 32) and not use the PSTN 22, the TRAC 24, or the telephony return upstream path at all.

TABLE 3

1. An IP 54 datagram from data network 28 destined for the CM 16 arrives on the CMTS-NSI 32 and enters the CMTS 12.
2. CMTS 12 encodes the IP 54 datagram in a cable data frame, passes it to MAC 44 and transmits it "downstream" to RF interface 40 on the CM 16 via cable network 14.
3. CM 16 recognizes the encoded IP 54 datagram in MAC layer 44 received via RF interface 40.
4. CM 16 responds to the cable data frame and encapsulates a response IP 54 datagram in a PPP 50 frame and transmits it "upstream" with telephony interface 48 via the PSTN 22 to TRAC 24.
5. TRAC 24 decodes the IP 54 datagram and forwards it via TRAC-NSI 30 to a destination on the data network 28.
6. In a two-way cable system, the CM 16 encapsulates a response IP 54 datagram in a cable data frame passes it to MAC 44 and transmits it "upstream" via CM 16 RF interface 40 to the CMTS 12 via cable network 14.
7. In a two-way cable system, the CMTS 12 decodes the IP 54 datagram from the cable frame and forwards it via TRAC-NSI 32 to a destination on the data network 28.

Initial Ranging (IR)

Figure 5:
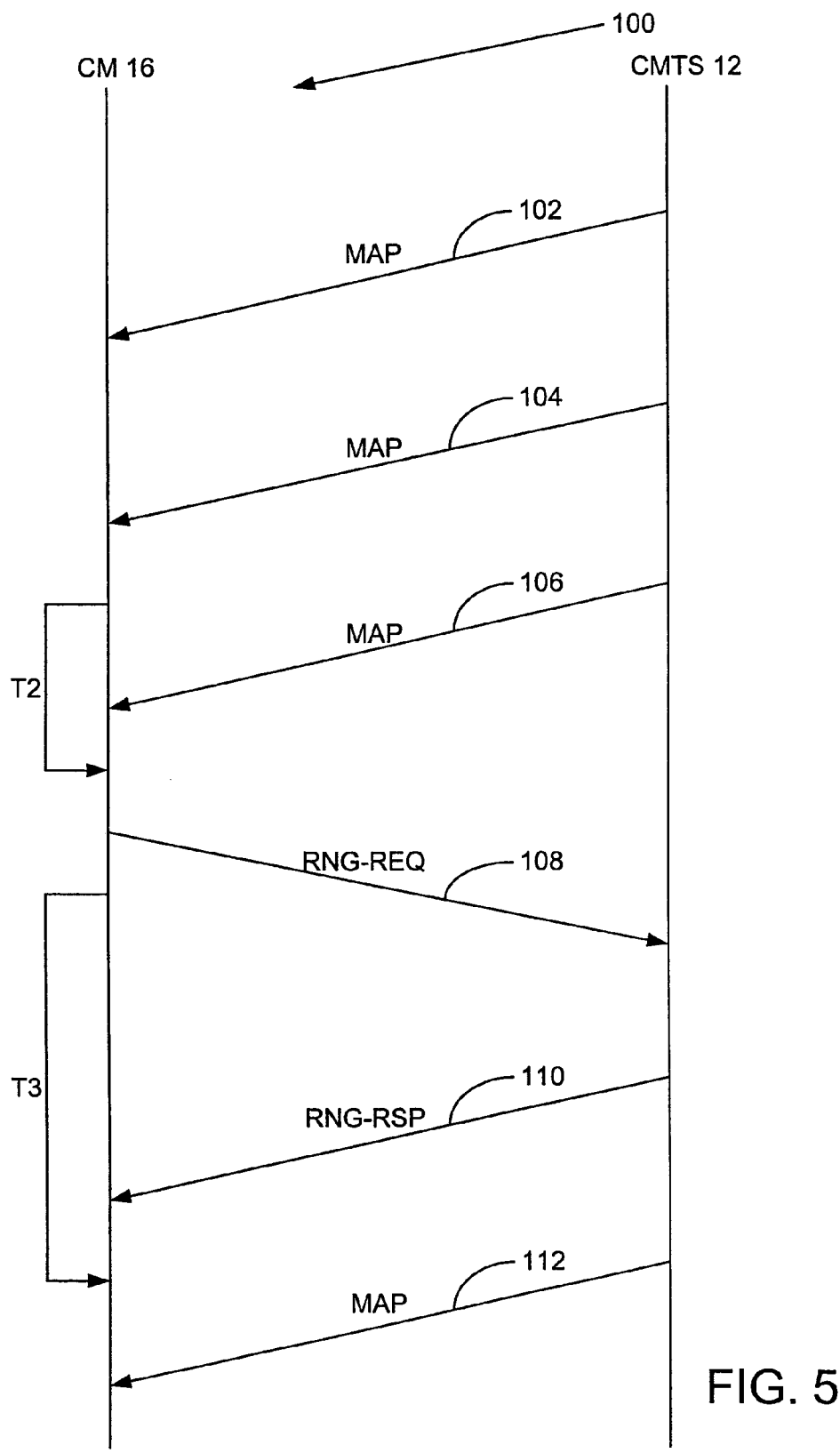
FIG. 5 is a diagram illustrating an exchange of initial ranging messages in accordance with a preferred embodiment of the present invention.

FIG. 5 is a diagram illustrating an exchange of initial ranging messages in accordance with a preferred embodiment of the present invention. As describes in DOCSIS, the CM 16 initiates IR by starting a timer (T2) and then waiting for an Initial Maintenance (IM) broadcast opportunity. IM broadcast opportunities are periodically sent downstream by the CMTS in MAPs. A MAP contains information describing upstream bandwidth allocation. Bandwidth is allocated for such things as transmit grants for CM 16 with pending requests, uni cast ranging opportunities for CM 16 station maintenance and broadcast ranging opportunities for CM 16 registration. If the T2 time expires before a MAP with broadcast ranging opportunity is received, the CM 16 resets the MAC layer and scans for the next available downstream communication. In a preferred embodiment, the timer T2 is defined to have a maximum time of approximately 10 seconds.

Figure 6:
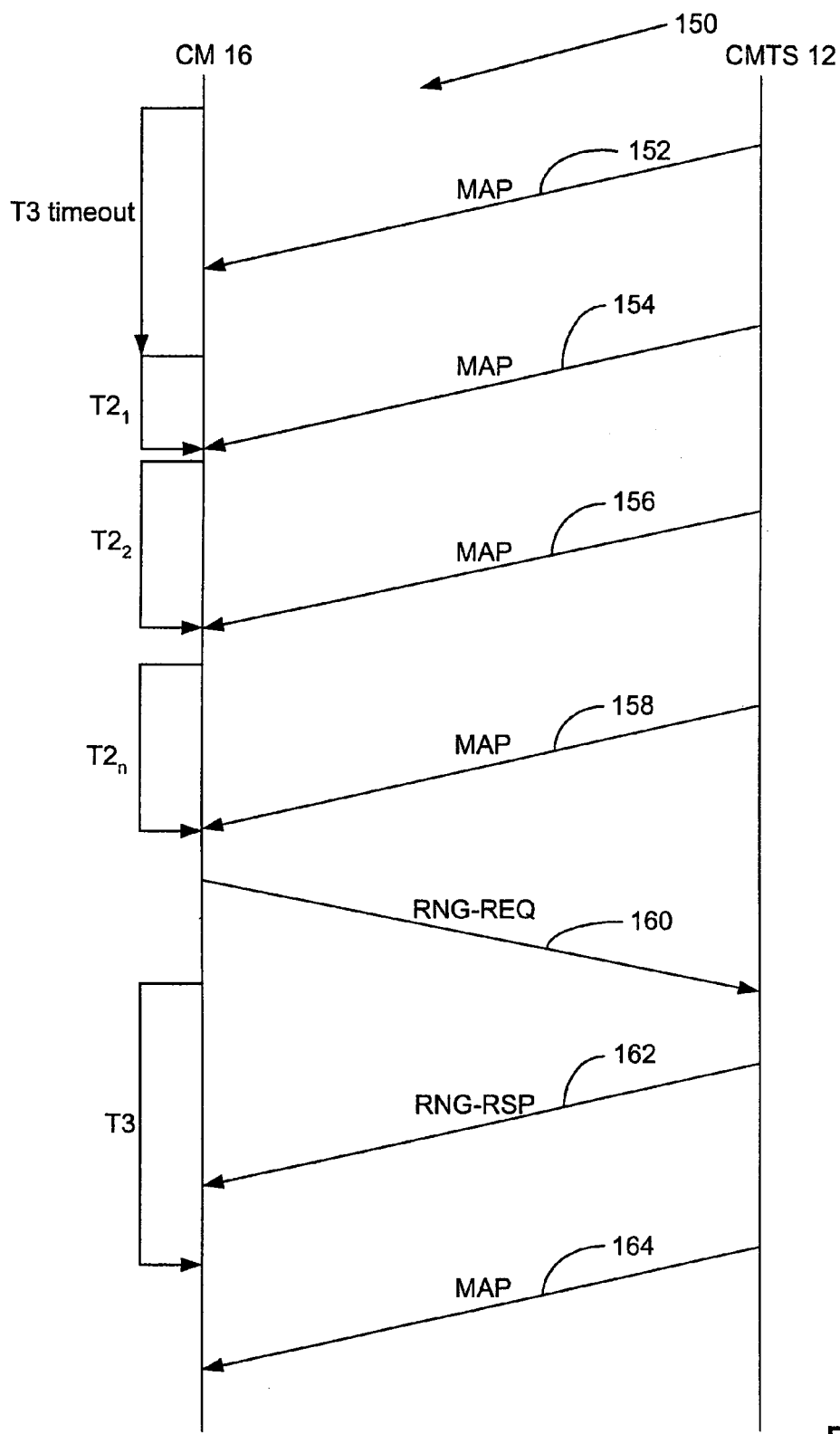
FIG. 6 is a diagram illustrating an exchange of initial ranging messages with backoff in accordance with a preferred embodiment of the present invention.

FIG. 6 is a diagram illustrating an exchange of initial ranging messages with backoff in accordance with a preferred embodiment of the present invention. Once a broadcast ranging opportunity has been received and the range request message RNG-REQ has been sent in the allocated timeslot, the CM 16 terminates the timer T2 and starts a timer T3. If the timer T3-expires before a range response message RNG-RSP is received from the CMTS 12, the CM 16 repeats the IR process but with a random backoff turned on and an adjustment in power. Only the first IR attempt for a given Upstream Channel Descriptor (UCD) can be attempted with random backoff turned off.

In a preferred embodiment, timer T3 is defined to have a maximum time of 200 milliseconds. A maximum of 16 retries can be issued for each available UCD. An IR attempt must be attempted on all available UCD before resetting the MAC layer and scanning for the next available downstream.

Failure of the CMTS 12 to recognize a CM 16 RNG-REQ can be due to collision and/or attenuation. During the IR process the CM 16 is required to transmit its RNG-REQ in the broadcast region specified in a MAP. The same broadcast region can be used by all unregistered CMs to register with the CMTS 12. This region is primarily used by the CMTS 12 to calculate the timing offset for an RNG-REQ from a CM 16. However, if two CMs attempt to register with the CMTS 12 at the same time a collision could occur. In this case, IR can be retried with random backoff turned on.

In the attenuation case, there may be enough attenuation in the cable plant that the CMTS is unable to detect the RNG-REQ of the CM 16. In this case, IR is retried with adjustments in power.

Because there are no mechanism in place for the CM 16 to determine the reason for not getting a RNG-RSP from the CMTS 12, the CM 16 must turn on random backoff and adjust power with each successive IR for a given UCD.

Per DOCSIS 1.1 section 9.2.4 after the first IR failure for a given Upstream Channel Descriptor (UCD) two adjustments must be made for successive IR. The first adjustment that should be made is to enable binary exponential random backoff. Random backoff used in the case of collision between one or more CM during IR is in the multicast bandwidth allocation region. Random backoff prevents lock-step RNG-REQ contention among several CM that are in the IR state. The second adjustment that must be made is adjustment in the CM transmit power.

This is to overcome impairments in the cable plant that may be attenuating the CM signal enough to make it too weak for the CMTS to receive the request. In DOCSIS 1.1 section 9.2.4.1 power adjustment of the CM transmit is left for vendor implementation.

Once the CMTS 2 receives a RNG-REQ from a CM 16, it responds with an RNG-RSP containing a temporary unicast System Identification number (SID) and upstream adjustments for power, frequency and timing.

From DOCSIS 1.1 there are few restrictions for power control, during IR. The only restriction defined is that the power output of the transmitter must stay within the dynamic range from +8 dBmV to +58 dBmV for QPSK modulation and +8 dBmV to +55 dBmV for 16 QAM modulation. The power level control must have a resolution of 1 dB. No specification is given for adjusting power with successive IR attempts.

Figure 7:
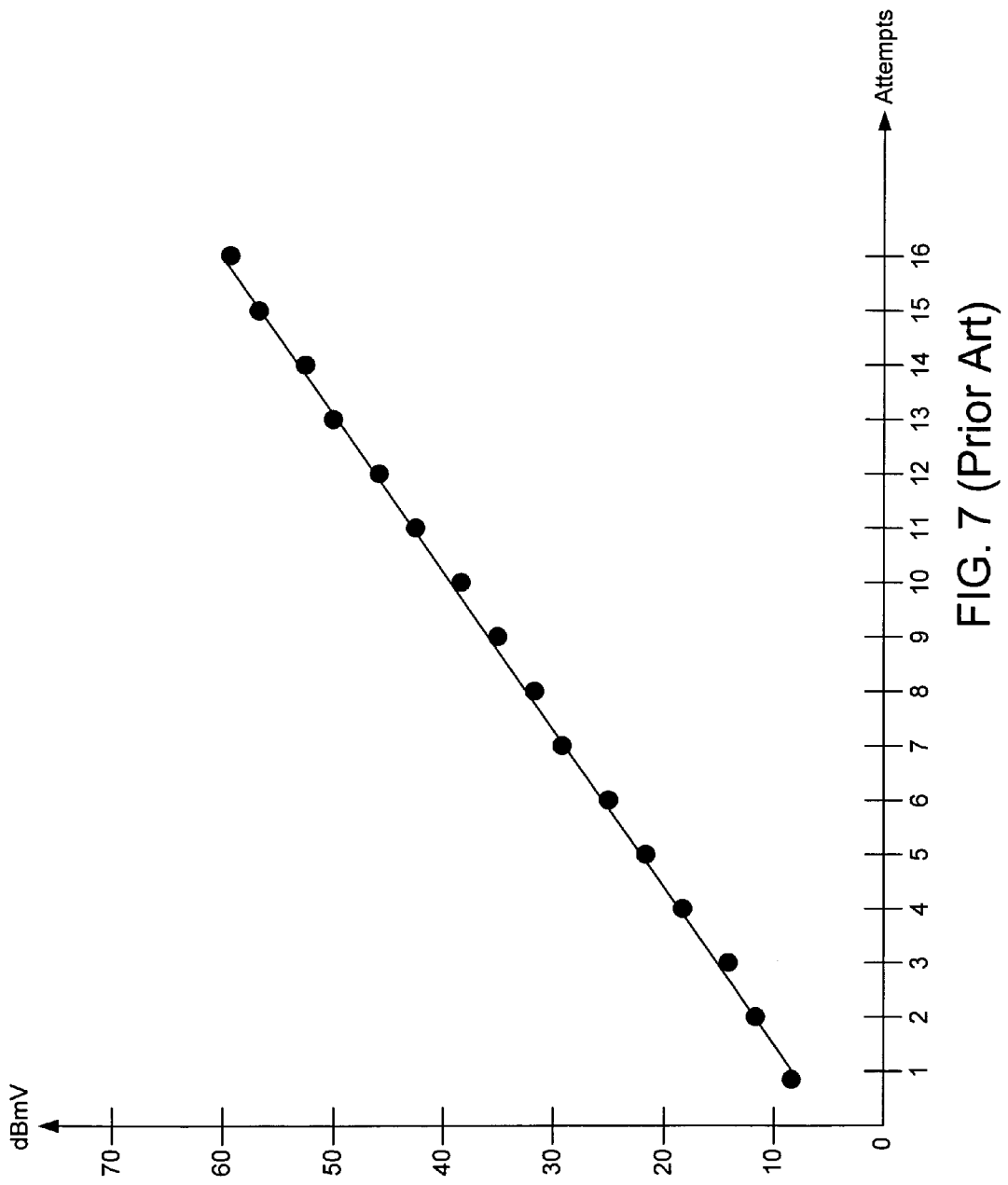
FIG. 7 is a graphical illustration of the results of a prior art method for adjusting the power level of a network client device.

FIG. 7 is a graphical illustration of a prior art method for adjusting the power level of a network client device. For successive IR power adjust the simplest approach is to use linear steps to cover the dynamic range of the CM 16 transmitter. If the CMTS 12 receiver is on the far end of the CM 16 dynamic range it could take several minutes before the CM 16 receives a RNG-RSP from the CMTS 12. This time varies with the minimum and maximum values used for the binary exponential random backoff. The random backoff value is set by the CTMS 12 in the downstream MAPs and is determined by the population of CM on the cable plant. A maximum of 16 IR attempts can be made for a given UCD before moving the next available UCD or scanning for the next downstream. With 16 IR attempts available the minimal step size is 3.18 dB (dynamic range/maximum number of attempts=51 dB/16) to cover the entire CM 16 transmitter dynamic range. The factional part of the step size can be truncated until it accumulates to carry over into an integer. The CMTS receiver must have a dynamic range of +/−6 dB from the optional receiver level. As an example, if a CM 16 has to power adjust to 52 dBmV to be within +/−6 dB of the CMTS receiver and minimum power adjustment step size is used for each IR attempt, then as many as 12 IR attempts may be used before the CM RNG-REQ is received by the CMTS. If the cable plant is heavily populated with CM, the backoff value may be large such that each successive IR attempt may take exponentially more time than the previous attempt.

To reduce the IR time to cover the entire CM 16 transmitter dynamic range, the system and method of the present invention takes advantage of the fact the CM transmitter power level must typically be within a range of +/−6 dBmV of the CMTS receiver. Thus, the CMTS receiver has a dynamic range of 12 dBmV. The dynamic range of the CM transmitter can be divided by the dynamic range of the CMTS receiver to give 4.25 (51/12) possible CM transmitter regions the CMTS receiver may be located. One or more IR can be attempted in each region before adjusting power for the next region. This requires as many as 5 IR attempts to cover the entire CM transmitter dynamic range. The lower the number of IR attempts to cover the CM transmitter dynamic range the less time needed for IR. If a RNG-RSP message is not received from the CMTS in the first sweep of the transmitter dynamic range a second sweep can be attempted but with a new adjusted power level for each region. Failure in the first sweep is most likely due to collision. As many sweeps as needed can be performed as long as the total number of IR attempts do not exceed 16 as defined by DOCSIS.

Effectively, larger power adjustment steps are taken to cover the CM transmitter dynamic range quickly. An adjustment in each region is interlaced with each sweep of the CM transmitter dynamic range. Assuming collisions are low, as few as 5 IR attempts may be needed, which is a great improvement over linear attempts described earlier.

Figure 8:
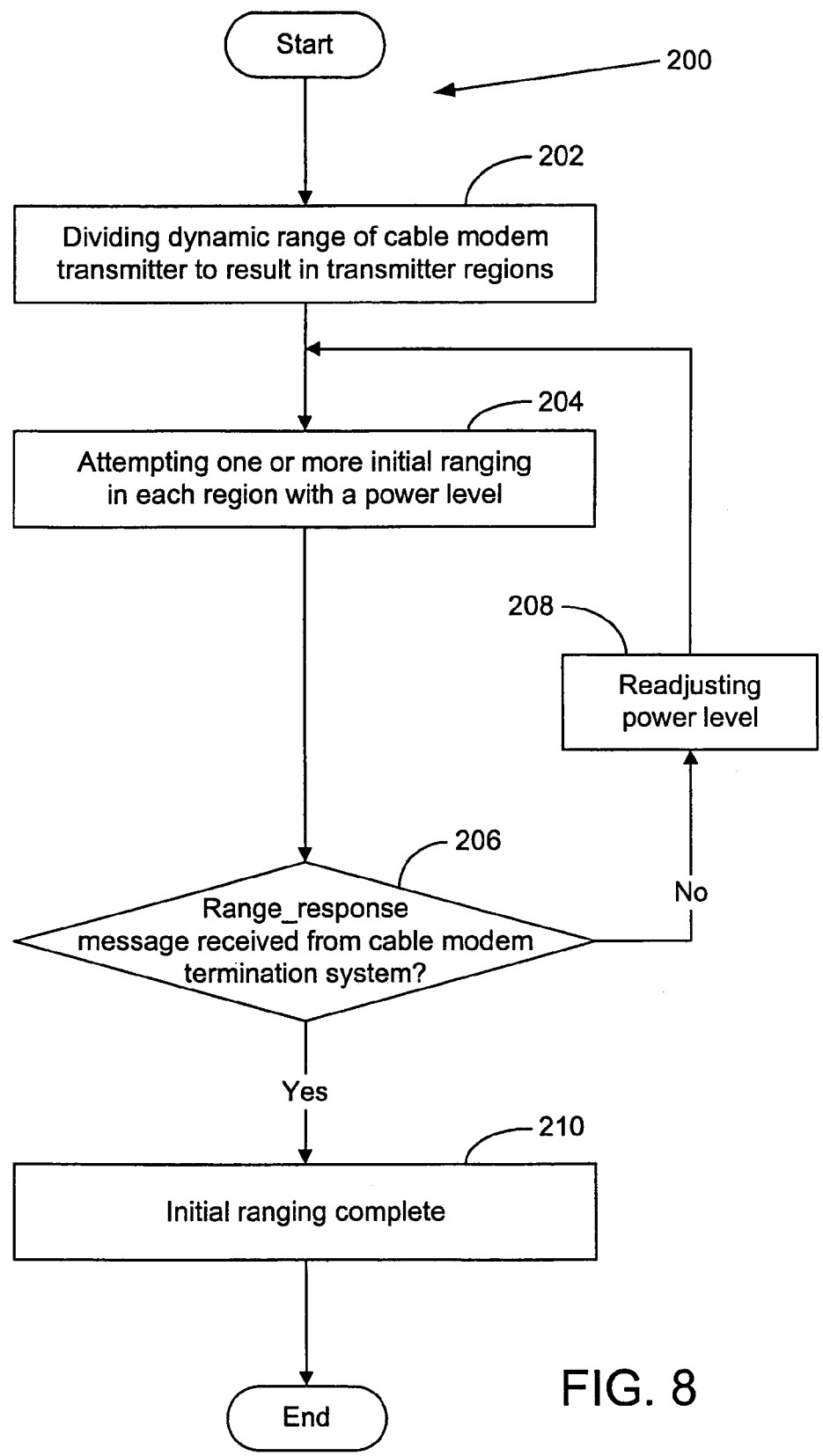
FIG. 8 is a flowchart illustrating a method for calibrating power level of a network client device in accordance with a preferred embodiment of the present invention.

FIG. 8 is a flowchart illustrating a method 200 for calibrating power level of a network client device in accordance with a preferred embodiment of the present invention. The method 200 begins with dividing the dynamic range of a transmitter of a network client device such as a cable modem to result in different transmitter regions per step 202. The method 200 further includes attempting one or more initial ranging in each region with a certain power level per step 204. It is then determined, per step 206, if a range response message is received from the network device such as a cable modem termination system. If no range response message is received, then the power level is readjusted per step 208 and initial ranging is reattempted per step 204 and the method 200 reiterates through. Once a range response message is received, initial ranging is completed successfully per step 210.

Figure 9:
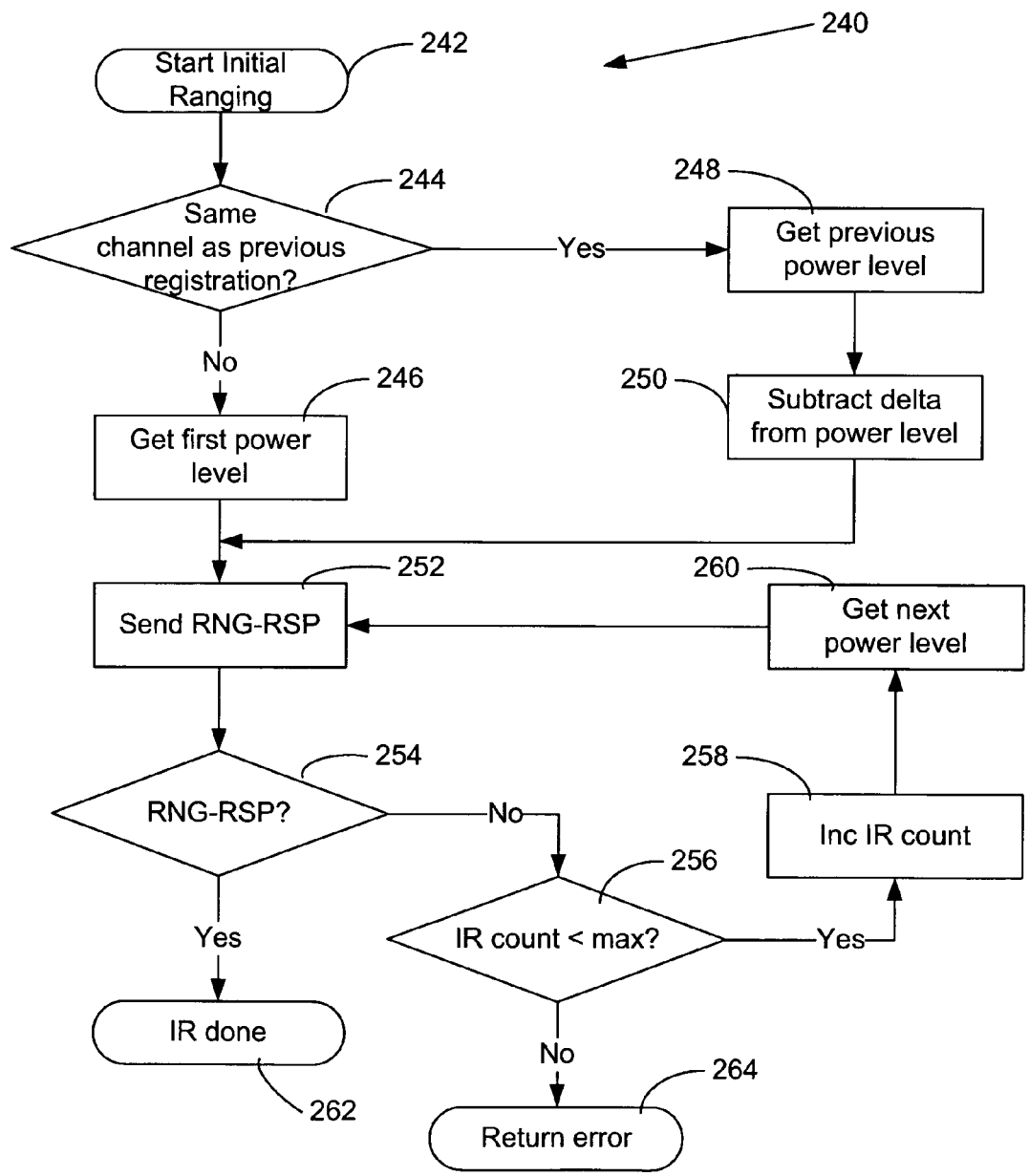
FIG. 9 is a flowchart illustrating a method for initial ranging power setting in accordance with a preferred embodiment of the present invention.

FIG. 9 is a flowchart illustrating a method 240 for initial ranging power setting in accordance with a preferred embodiment of the present invention. It is first determined in step 242, if the channel is the same as the previous registration, that is current downstream frequency and UCD is the same as the last time the CM was registered. If yes, the CM transmitter power level used during the previous registration is used for the very first IR minus 4 dB per steps 248, 250. The minus 4 dB is to prevent possible overshoot. If not, a power level is first attained per step 246. If the CM does not receive a RNG-RSP at that power level per step 252,254 then an interleaved power ramp up process sequence is used for successive IR per steps 256, 258 and 260. The interleave power ramp up is also used in the case if the downstream frequency or UCD is not the same as last registration.

Figure 10:
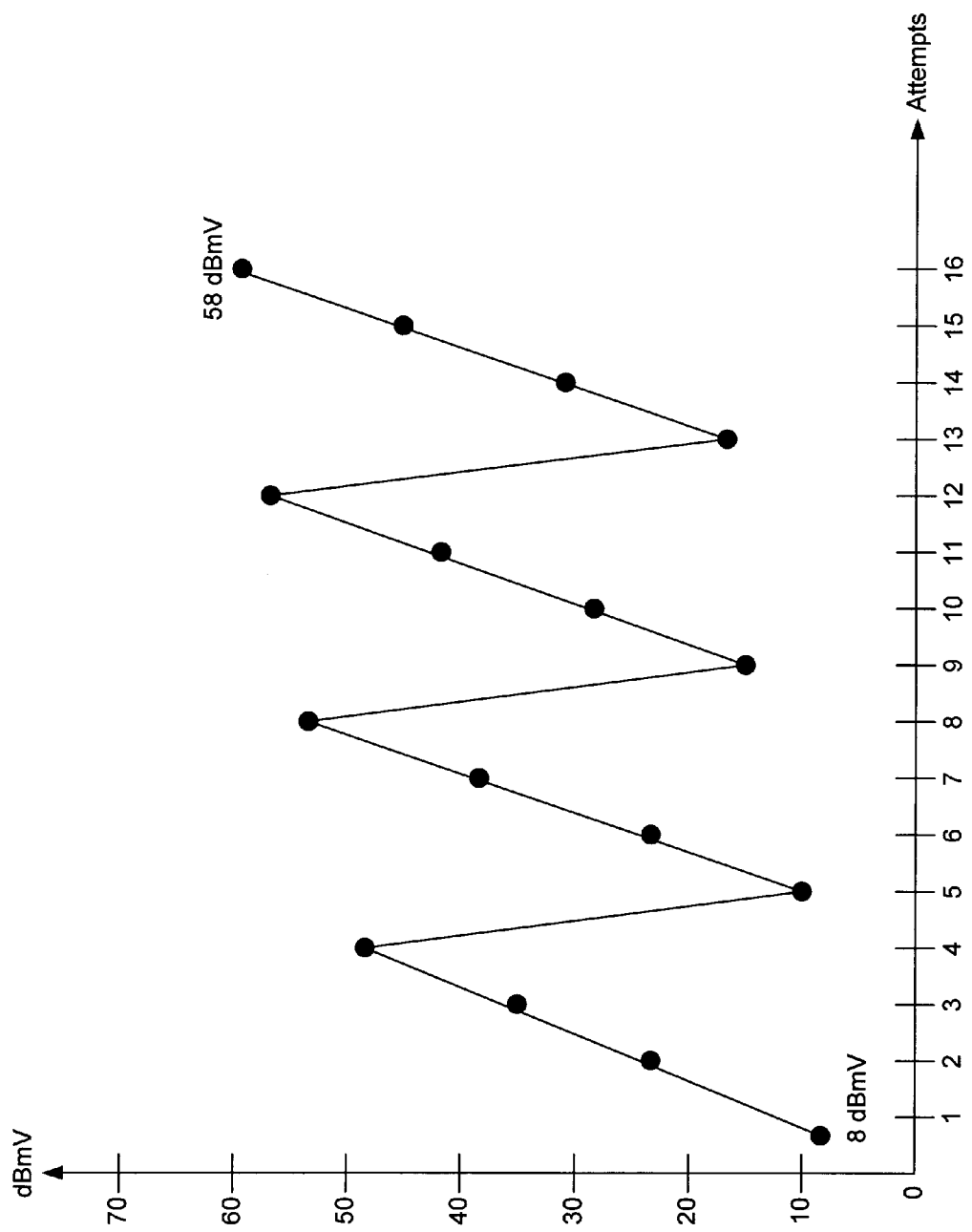
FIG. 10 is a graphical illustration of the results of the system and method for calibrating power level of a network client device in accordance with a preferred embodiment of the present invention.

FIG. 10 is a graphical illustration of the results of the system and method for calibrating power level of a network client device in accordance with a preferred embodiment of the present invention. The interleave power ramp up is based on the principle of covering the dynamic range of the CM transmitter as quickly as possible. This is possible if the dynamic range of the CM transmitter is divided into regions the CMTS might be located in. As described herein before, the CM transmitter power level must typically be within +/−6 dBmV of the CMTS receiver. This implies the CMTS receiver has a dynamic range of 12 dBmV. The dynamic range of the CMTS receiver divides into the dynamic range of the CM transmitter to give 5 possible regions.

Instead of power ramping by taking small delta increments to cover the entire dynamic range of the CM transmitter, an IR in each of the possible regions is attempted to cover the entire dynamic range of the CM transmitter quickly. Using only a single pass of the CM transmitter dynamic range is to assume no collision has occurred during the IR in each region. For the possibility that a collision could have occurred during the first sweep, a second IR attempt is performed in each region but with a different power level. This interleaving can be done as many time allowed as long as the total number of IR attempts does not exceed the 16 IR attempts per UCD as defined in DOCSIS. In the case where the CMTS receiver is at 52 dBmV the CM may only have to do as many as 5 IR attempts to register with the CMTS. This is assuming no collision has occurred in the region the CMTS is located in. Even if a collision did occur in the first pass, as many as 10 IR attempts may be needed to register with the CMTS in the second pass. This is still less than the number of IR that are required if linear incremental steps were used. Overall, 16 available IR attempts per UCD are not needed to adequately cover the dynamic range of the CM transmitter.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, other embodiments in hardware or firmware implementations may alternatively be used, and vice-versa.

It will be apparent to those of ordinary skill in the art that methods involved in the system and method for calibrating power level during cable modem initial ranging may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless to having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. In a data-over-cable system, a method for establishing communications between a network client device and a network device; the method comprising:
   a) dividing a dynamic range of the network client device into a plurality of regions by dividing the dynamic range of a transmitter of the network client device by the dynamic range of a receiver of the network device;
   b) initiating at least one initial ranging in at least one of the regions using a certain power level;
   c) determining if a range response message is received from the network device;
   d) adjusting the power level and reinitiating step b) and c) till a range response message is received.

2. The method of claim 1, wherein the network client device is a cable modem.

3. The method of claim 1, wherein the network device is a cable modem termination system.

4. A computer readable medium having stored therein instructions for causing a processing unit to execute the steps of the method of claim 1.

5. The method of claim 1, wherein the step of initiating at least one initial ranging includes sending a range request message.

* * * * *